May 20, 1941.    K. SAKAMOTO    2,242,620
SHUTTLE CHANGE MECHANISM FOR POWER LOOMS
Filed Feb. 25, 1938    5 Sheets-Sheet 1

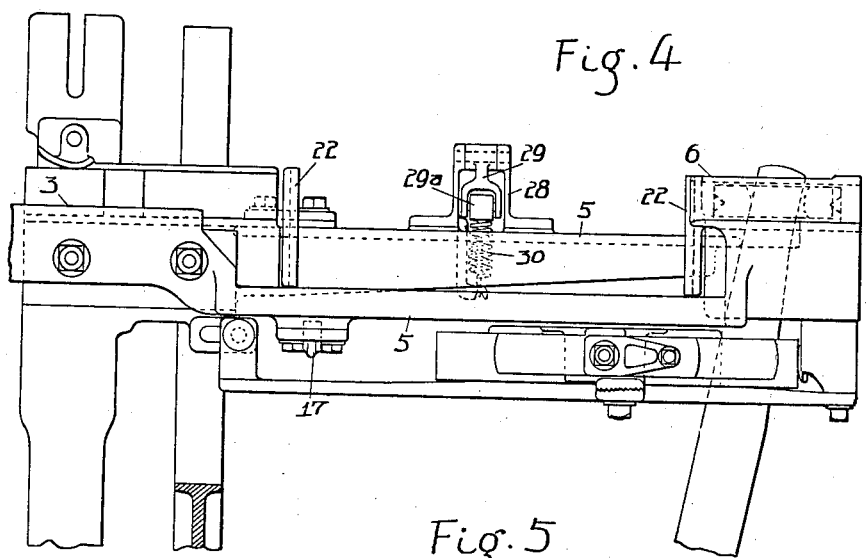
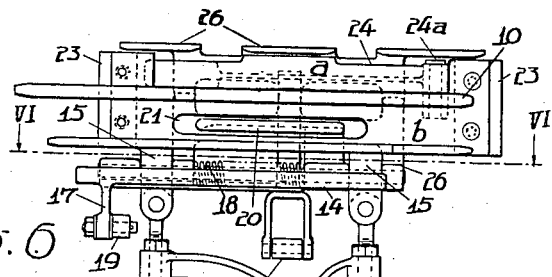
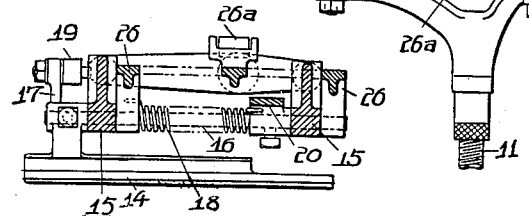

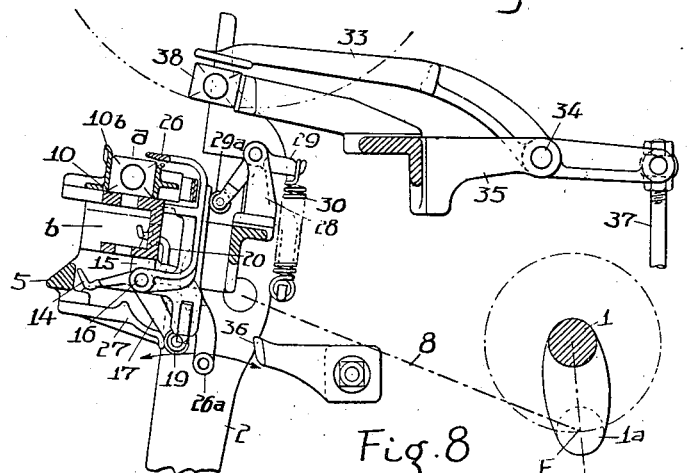
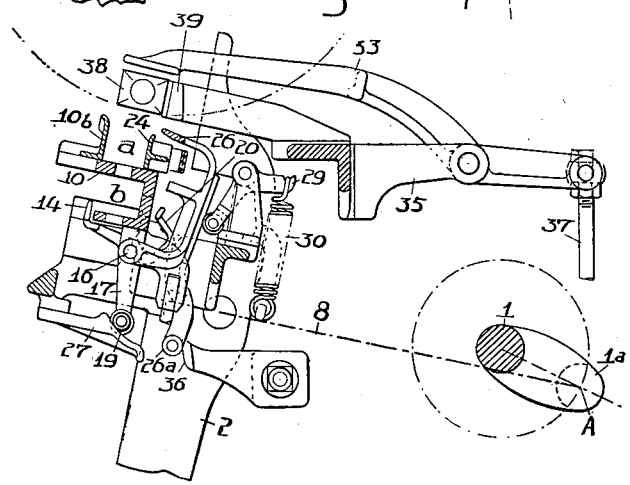

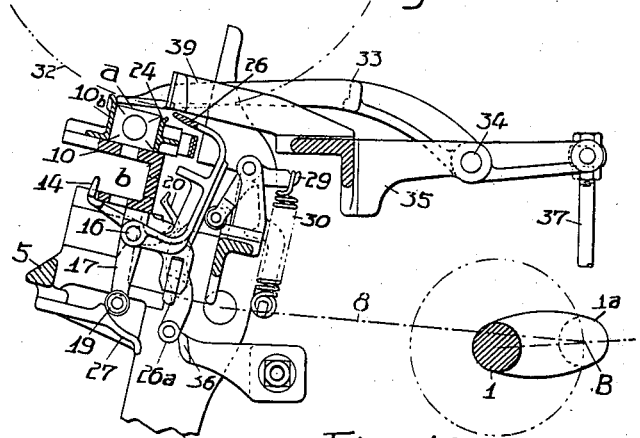
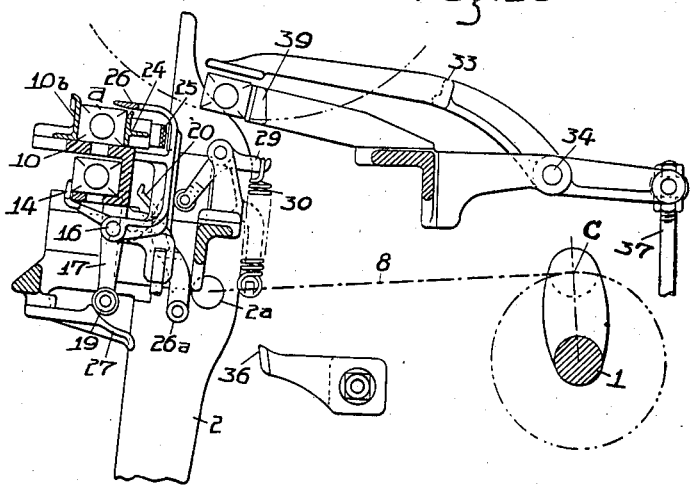

Patented May 20, 1941

2,242,620

UNITED STATES PATENT OFFICE 2,242,620

SHUTTLE CHANGE MECHANISM FOR POWER LOOMS

Kyugoro Sakamoto, Hamamatsu, Japan

Application February 25, 1938, Serial No. 192,663
In Japan March 11, 1937

3 Claims. (Cl. 139—239)

This invention relates to improvements in a shuttle change mechanism for power looms. In known shuttle change mechanisms a loaded shuttle is supplied in a shuttle box after a used one has been discharged from the box. In other words shuttles are changed in one and the same shuttle box.

In such a mechanism the rear and the front walls of a shuttle box are intermittently removed from their normal positions in order to make way to discharge the used shuttle and to receive a new loaded one. This is very disadvantageous to the shuttle's motion, because the front and back walls of a shuttle box serve to guide a shuttle to take a proper course in the shed when it is picked, and movable guide walls are difficult to use for accurately guiding a shuttle. Sometimes a shuttle is accidentally put between the movable wall and the box, or a newly supplied shuttle collides with the used one due to an imperfect discharge motion of the shuttle change mechanism. These facts cause troubles in weaving.

According to this invention a shuttle box is provided with two shuttle-receiving spaces, which will be called in this specification an operating compartment and a discharging compartment, respectively, and the operating compartment is used for receiving a shuttle while the loom is operating in the normal weaving condition. In case the weft in the shuttle is exhausted or broken and a new loaded shuttle is to be used, the shuttle box is vertically lifted so as to bring the discharging compartment in alignment with the shed of the batten frame to receive the used shuttle and to bring the operating compartment to a position where a new loaded shuttle is supplied. As soon as a new shuttle has been supplied to the operating compartment and the used shuttle has been received by the discharging compartment, the shuttle box is lowered to its original position and the used shuttle is discharged from the discharging compartment while the new shuttle is placed in operation in the operating compartment.

These operations are originated from the weft fork or weft feeler mechanism through intermediate mechanisms, but as the latter does not form a part of this invention its illustration is omitted.

The annexed drawings illustrate an embodiment of this invention.

Figure 4 is a front elevation of a frame on which a shuttle box is to be provided.

Figure 5 is a front elevation of a shuttle box, the front wall of the operating compartment being removed to show the interior thereof.

Figure 6 is a sectional plan view on line VI—VI of Figure 5.

Figures 7, 8, 9 and 10 are sectional elevations of a shuttle box and the neighboring members in several operating positions, showing how the shuttles are changed.

Figure 7 shows the position where the loom is operating in the normal condition.

Figure 8 shows the position where a new shuttle is about to be supplied to the operating compartment of the shuttle box.

Figure 9 shows the position where a new shuttle has been just supplied to the operating compartment, and the discharging compartment is ready for receiving a used shuttle.

Figure 10 shows the position where a used shuttle has just been received by the discharging compartment.

Figure 1:
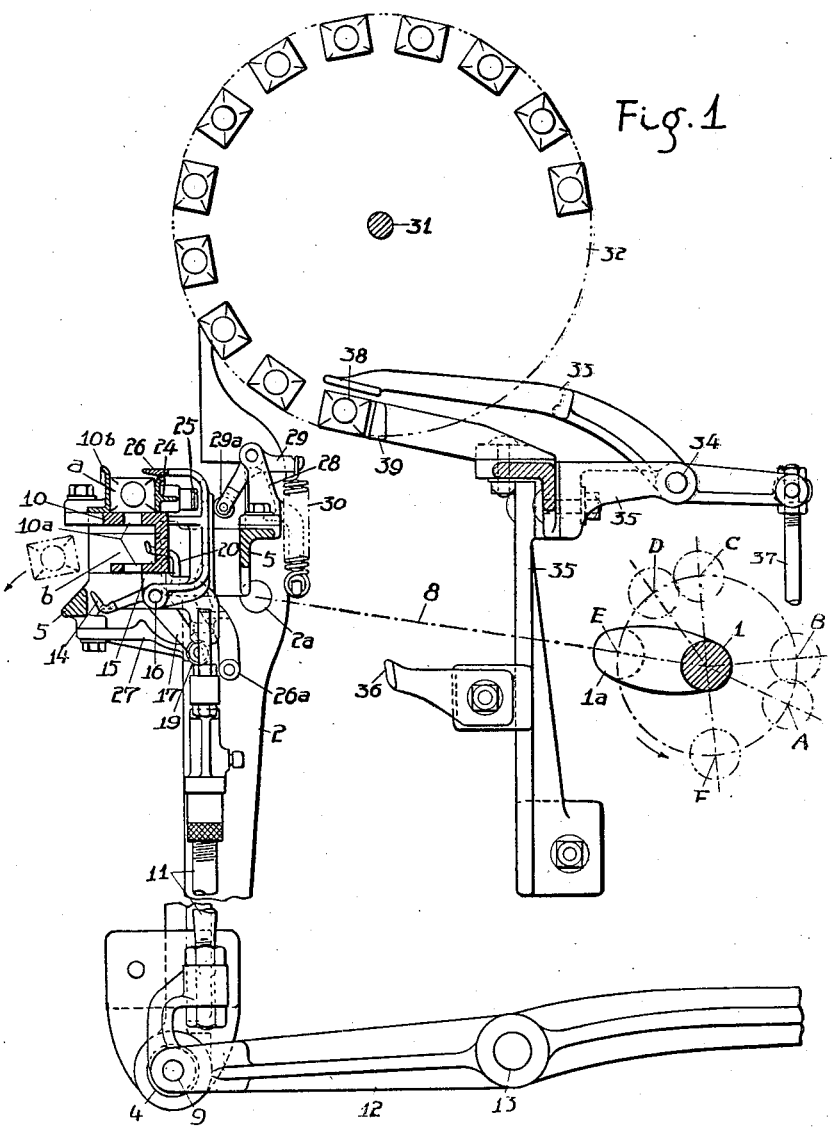
Figure 1 is a part sectional side elevation of a shuttle change mechanism including the section on the line I—I of Figure 2, with parts omitted for the sake of clearness in illustration, and a used shuttle is just discharged from the discharging compartment and the shuttle box is resuming the normal operating condition.
Figure 2:
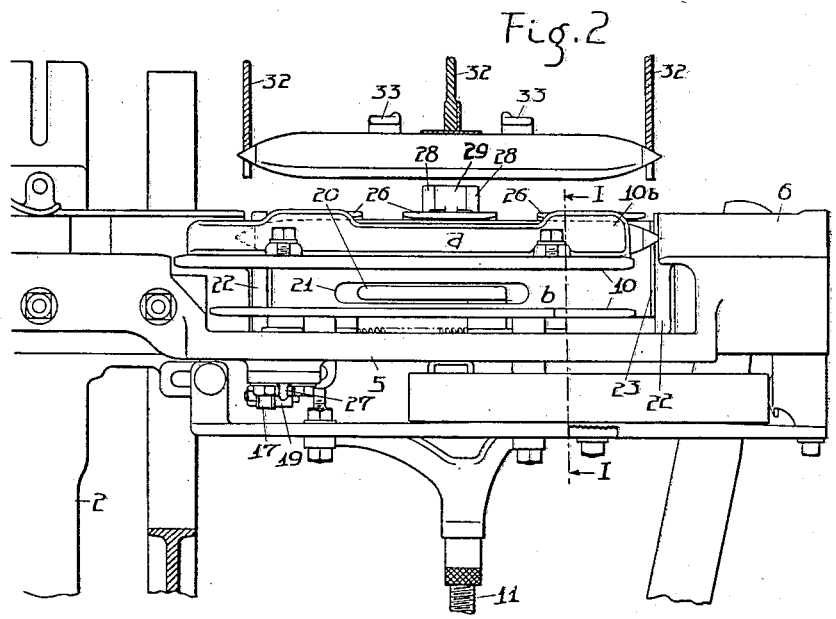
Figure 2 is a front elevation of a shuttle box provided in a frame which is mounted at an end of the shed on a batten-frame.
Figure 3:
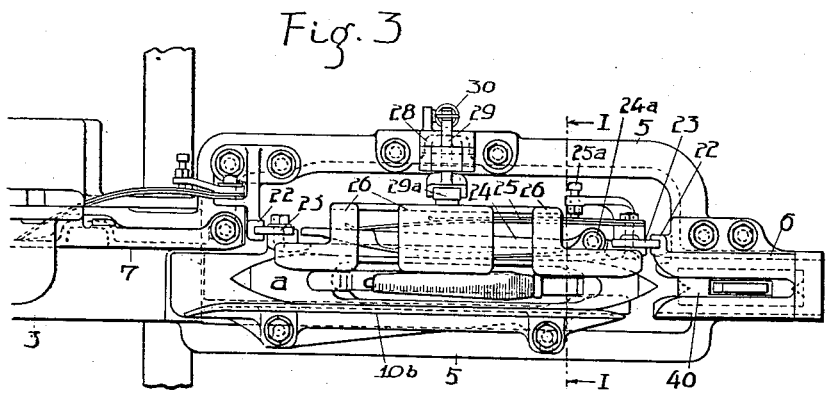
Figure 3 is a plan view of the same.

Referring to Figures 1, 2 and 3, 1 is a crank shaft of a loom, which operates a sword 2 on which a batten frame 3 is provided. The sword, as usual, is rocked to and fro on a rocking shaft 4 by means of the crank shaft.

The batten frame 3 has a small frame 5 at an end thereof, and a picker guide 6 is rigidly fixed to the frame 5. 7 is a guide member provided at the entrance of the frame, which leads a shuttle to a correct position in the shuttle box when it is running along the shed.

1a is the crank pin and 2a is a pin on the sword. These pins are connected by means of a connecting rod which is indicated by a chain line 8. The letters A, B, C, D, E and F on the locus of the crank pin indicate several positions of the pin which correspond to the various positions of the shuttle box and the times of picking as hereinafter described.

A shuttle box is slidably held in the frame 5 and supported by a rod 11, which is pivoted on a pin 9. This pin is held at the extreme end of a lever 12, which in turn, is pivoted on a pin 13 fixed on the machine frame. The pin 9 is in alignment with the rocking shaft 4 but is independent of the latter.

As shown in Figures 1 and 5, the shuttle box is made of a long channel-like piece 10 placing its open side in front, with a slit 10a on the opposite sides of the piece for the passage of the picking lever. A plate 10b is vertically fixed to the top of the piece and makes a compartment with top side open on the piece 10 co-operating with a brake shoe 24 which is explained later on. The interior space b of the channel piece is the discharging compartment and the space a between the plate or front wall 10b and the brake shoe 24 is the operating compartment.

The front opening of the discharging compartment can be partly covered by a long piece 14 which is called hereinafter the front wall, while the top opening of the operating compartment, too, can be partly covered by a long piece 26 which is called a cover plate.

The front wall 14 of the discharging compartment is fixed to a spindle 16 which is rotatively mounted on brackets 15 of the shuttle box, and an arm 17 is fixed to the front wall. Another arm 20 with a horizontal extension 20a is integrally made with the front wall 14, and the arm bends upwards and in front so that the horizontal extension enters into a horizontal slot 21 provided in the rear wall of the discharging compartment. This horizontal part 20a serves to push out a used shuttle received in the lower compartment as hereinafter described.

The spindle 16 is provided with a helical spring 18, which serves to rotate the spindle in the clockwise direction (Figure 1), so that a roller 19 provided at the end of the arm 17 is always in contact with the guide surface of a cam piece 27 fixed to the frame 5. The curve of the guide surface is such that when the shuttle box is in its highest position relative to the frame 5 as shown in Figure 9 or 10, the front wall 14 takes its proper position while the arm 17 takes its vertical position.

Referring to Figures 3, 4 and 5, there is an offset 22 at each end of the frame 5, and a plate 23 is provided at each end of the shuttle box to be slidably fitted in a vertical groove of the offset, so that the shuttle box can be vertically slid along the frame.

The back wall of the operating compartment is made by a brake shoe or swell 24 which is hinged at its end on a pin 24a fitted to the shuttle box, and a spring 25 acts to press the swell so as to brake a shuttle which is received in the operating compartment. The pressure of the spring can be adjusted by a screw 25a.

The cover plate 26 for the operating compartment a is pivoted on the spindle 16 at its lower end, and an extended part having a roller 26a at its end is integrally provided on the back of the cover plate. The cover 26 extends almost the whole length of the shuttle box as shown in Figures 3 and 5, and serves to prevent a shuttle from getting out of the shuttle box when it is picked.

There is a bracket 28 fixed to the frame 5, on which is pivoted a lever 29. This lever is under the action of a spring 30 so as to always press the cover plate at its back by means of a roller 29a provided at the other end of the lever. When the roller 26a collides with a projection 36 which is fixed to the frame 35 of the machine, the cover 26 is rocked on the spindle 16 against the action of the spring 30 so that the top of the operating compartment a is opened as shown in Figure 8.

Referring to Figure 1, 31 is an intermittently rotative shaft on which a hopper 32 for shuttles is fixed. A lever 33 which is pivoted on a pin 34 provided on the machine frame 35 co-operates with the hopper. The lever 33 is actuated by a rod 37 so as to push a loaded shuttle on the hopper when in the position marked 38 where the shuttle is stopped by a stop 39. When a loaded shuttle on the hopper has been pushed into the shuttle box and the lever 33 is returned to its original position, the hopper is rotated slightly by means of a ratchet wheel by the action of the returning lever until the next shuttle on the hopper is checked by the stop, and stops in that position until the next shuttle is pushed out. The lever 33 is operated to push the shuttle placed in the position 38 when the operating compartment a of the shuttle box is just beneath that position as described below.

As the shuttle box is pivotally held on the pin 9 which is in alignment with the rocking shaft 4, no relative motion is caused between the shuttle box and the batten frame when the sword is rocked on the rocking shaft, so that a shuttle picked out of the shuttle box slides correctly in the shed, while a shuttle coming along the shed is received by the box without failure.

In case the weft is exhausted or broken and a shuttle change motion is to be started, the weft fork or weft feeler mechanism acts in the usual way, and by means of intermediate mechanisms, which do not form parts of this present invention so that they are not shown in the drawings, the lever 12 with the rod 11 is raised and immediately thereafter the rod 37 is raised. The shuttle box is now lifted along the frame 5, and the roller 26a collides with the projection 36 when the sword is almost at the end of its backward motion. The projection, however, is out of the way of the passage of the roller when the shuttle box is in the normal position as shown in Figure 7. When the roller 26a collides with the projection 36 as shown in Figure 8, the cover 26 is retired against the action of the spring 30, and the top entrance of the shuttle box is placed immediately beneath the shuttle in the position 38 on the hopper. As soon as the shuttle box takes this position, the lever 33 is operated to push the shuttle remaining at the position 38 into the compartment a, and when a shuttle has been pushed into the compartment a, the lever 12 returns to its normal position while the sword is rocking forwards, so that the roller 19 slides along the guide face of the cam piece 27 whereby the spindle 16 is turned against the spring 18.

In the normal weaving condition, the levers 12 and 33 keep their normal positions as shown in Figure 1, and the working shuttle is received by the operating compartment a at each alternate stroke while the sword is rocking to and fro.

The operation of this mechanism is as follows:

In case the weft in the shuttle is exhausted or broken, the lever 12 raises the rod 11 while the crank pin is rotating from the point F to B, and the shuttle box slides upward along the frame 5. During the time the shuttle box is rising the arm 17 gradually takes its vertical position until the wall 14 of the discharging compartment b occupies its closed position (see Figure 8). As soon as the shuttle box reaches almost the highest position, the roller 26a collides with the projection 36 whereby the cover 26 is retired from the top of the shuttle box, and the lever 33 pushes the shuttle in the position 38 of the hopper into the operating compartment a as shown in Figure 9 while the crank pin is rotating from the point A to B. As soon as the roller 26a is out of contact with the projection 36 when the sword is rocking forward, the cover 27 recovers its normal position so as to partly close the top of the shuttle box.

The discharging compartment b being now in alignment with the shed, the used shuttle which is now picked by the picker of the other side and is coming to the shuttle box while the crank pin is rotating about the point C, is received by the discharging compartment b (see Figure 10), and the picker 40 is brought to the extreme position by the strike of the shuttle. By the reaction of this strike, the shuttle retires a little so as to separate itself from the picker. The degree of retreat of the shuttle can be adjusted by controlling the strength of the spring 18 which determines the force of the front wall 14 of the discharging compartment b acting on the received shuttle.

When the crank pin is rotating from the point D to E, the shuttle box is lowered with a shuttle in each of the compartments a and b, while the roller 19 slides along the guide face so that the wall 14 moves to open the front part of the compartment b while the arm 20 penetrates the compartment so that the used shuttle which has been just received by the compartment b is discharged as shown in Fig. 1. All the shuttle change motion has now been completed, and the loom works in normal condition.

What I claim is:

1. In a shuttle change mechanism for power looms, a shuttle box having upper and lower compartments, the upper compartment normally serving to receive the working shuttle and the lower compartment to receive the exhausted shuttle when a shuttle is changed, a shuttle box lifting means which lifts the shuttle box upwardly on the lay when the shuttle is to be changed, a rotary shuttle hopper provided at such a position that when the shuttle box is lifted and the lay is in the rearmost position, the top opening of the shuttle box is just beneath the place where a loaded shuttle is projected from the hopper, a cover normally closing the top opening of the upper compartment of the shuttle, a means to open the cover as the shuttle box is lifted and the lay is in the rearmost position, means to project a loaded shuttle placed in the hopper into the shuttle box when the cover of the top opening of the box is opened, a front wall for the lower compartment and an arm for discharging a shuttle located in the lower compartment, and means to remove said front wall from the front side of the lower compartment and to have the arm pushed in the lower compartment when the shuttle box is lowered from its raised position, to expel the exhausted shuttle.

2. In a shuttle change mechanism for power looms, a shuttle box having upper and lower compartments, the upper compartment normally serving to receive the working shuttle and the lower compartment to receive the exhausted shuttle when a shuttle is changed, a shuttle box lifting means which lifts the shuttle box upwardly on the lay when the shuttle is to be changed, a rotary shuttle hopper provided at such a position that when the shuttle box is lifted and the lay is in the rearmost position, the top opening of the shuttle box is just beneath the place where a loaded shuttle is projected from the hopper, a cover normally closing the top opening of the upper compartment of the shuttle, a projection provided on the machine frame which acts to open said cover as the shuttle is lifted and the lay is in the rearmost position, a lever member pivoted on the frame which projects a loaded shuttle placed in the hopper into the shuttle box when the cover of the top opening of the box is opened, a front wall for the lower compartment and an arm for discharging a shuttle located in the lower compartment, and a cam including means provided on the lay which acts to remove the front wall from the front side of the lower compartment and to push the arm into the compartment when the shuttle box is lowered from its raised position to expel the exhausted shuttle.

3. In a shuttle change mechanism for power looms, a shuttle box having upper and lower compartments, the upper compartment normally serving to receive the working shuttle and the lower compartment to receive the exhausted shuttle when a shuttle is changed, a shuttle box lifting means which lifts the shuttle box upwardly on the lay when the shuttle is to be changed, a rotary shuttle hopper provided at such a position that when the shuttle box is lifted and the lay is in the rearmost position, the top opening of the shuttle box is just beneath the place where a loaded shuttle is projected from the hopper, a cover normally closing the top opening of the upper compartment of the shuttle and pivoted on a pin provided on the shuttle box having an extension which collides with a projection provided on the machine frame as the shuttle box is lifted and the lay is in the rearmost position, a lever member pivoted on the frame which projects a loaded shuttle placed in the hopper into the shuttle box when the cover of the top opening of the box is opened, a front wall for the lower compartment, an arm for discharging a shuttle located in the lower compartment, and a contact roller, all fixed on a spindle pivoted on the shuttle box, and a cam member provided on the lay which controls the motion of the contact roller so that the front wall of the lower compartment is removed from the front side of the compartment and the arm is pushed in the compartment when the shuttle box is lowered from its raised position to expel the exhausted shuttle.

KYUGORO SAKAMOTO.